(12) United States Patent
Liu

(10) Patent No.: US 6,897,986 B2
(45) Date of Patent: May 24, 2005

(54) DRIVING DEVICE FOR SCANNING MODULE

(75) Inventor: Chin-Te Liu, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 687 days.

(21) Appl. No.: 09/879,484

(22) Filed: Jun. 12, 2001

(65) Prior Publication Data

US 2002/0145767 A1 Oct. 10, 2002

(30) Foreign Application Priority Data

Apr. 9, 2001 (TW) ........................................ 90205453 U

(51) Int. Cl.$^7$ ................................................. H04N 1/04
(52) U.S. Cl. ........................ 358/474; 358/494; 359/196
(58) Field of Search ........................ 358/474, 494–497, 358/412, 471, 483, 296, 498; 382/274; 345/168; 359/196; 250/208.1

(56) References Cited

U.S. PATENT DOCUMENTS 5,523,876 A * 6/1996 Tellam et al. ................ 359/196

* cited by examiner

Primary Examiner—Mark Wallerson
Assistant Examiner—Heather D. Gibbs
(74) Attorney, Agent, or Firm—Rabin & Berdo, P.C.

(57) ABSTRACT

The present invention relates to a driving device for a scanning module. An active gear wheel and a passive gear wheel are disposed respectively on two rigid frames. These two rigid frames are connected by a rigid component to avoid relative displacement between the two wheels due to external force or change of temperature. A spring is disposed on the rigid component to adjust the position of the passive gear wheel while the active gear wheel stays still. It allows the driving belt to automatically offset the strain according to its fatigue condition. The rigid component of the present invention may also be adopted as a guiding track for the scanning module.

9 Claims, 5 Drawing Sheets

DRIVING DEVICE FOR SCANNING MODULE

FIELD OF THE INVENTION

The present invention relates to a driving device for a scanning module and, more particularly, to a driving device which prevents the possible slack of the driving belt due to displacement of the gear wheels.

BACKGROUND OF THE INVENTION

Many offices are equipped with scanners or multiple function peripherals (MFP) nowadays. The scanning equipment scans drawings, articles, and photos and saves them as image files. For the sakes of cost and visual effect, plastic is generally introduced as a material for the base plate of the scanning equipment.

Some do not consider plastic the best choice as a material for the base plate. First of all, plastic tends to deform when the temperature substantially changes. It is almost impossible to avoid the change of temperature when shipping or operating the scanning equipment, and therefore an environmental test is required for the scanning equipment to ensure its quality. The environmental test is generally carried out under a range of temperature from −40° C. to +70° C. Exposing to such severe environmental conditions, the plastic base plate suffers from large deformation and cannot remain level. Second, plastic is not durable. Collision is usually unavoidable when shipping and operating the scanning equipment, and it results in the deformation of the base plate. The precise function of the scanning equipment cannot be brought into full play as designed when such an unacceptable deformation occurs.

FIG. 1 illustrates the driving device for the scanner of the prior art. An active gear wheel 11 and a passive gear wheel 12 are directly connected to a plastic base plate 14 of the scanner, and a driving belt 13 is engaged with the active gear wheel 11 and the passive gear wheel 12. A scanning module (not shown) is connected to and driven by the driving belt 13 by means of a connecting component (not shown). When the driving belt 13 is driven by the active gear wheel 11, the scanning module is pulled forward by the driving belt 13 accordingly. A rigid component is disposed on the plastic base plate 14 as a guiding track 15 for the scanning module so that the scanning module moves forward along the guiding track 15 and proceeds in the same direction.

Because the active gear wheel 11 and the passive gear wheel 12 are respectively directly connected to the plastic base plate 14, there is relative displacement between the active gear wheel 11 and the passive gear wheel 12 when the plastic base plate 14 deforms. The relative displacement between the active gear wheel 11 and the passive gear wheel 12 affects the tension of the driving belt 13. One of the solutions is to introduce a metal base plate to avoid deformation of the base plate 14. However, introducing metal materials for the base plate 14 results in increase of production cost and worse portability and appearance.

SUMMARY OF THE INVENTION

The present invention provides a driving device for a scanning module. An active gear wheel and a passive gear wheel are disposed respectively on two rigid frames. The rigid frame on which the active gear wheel is disposed is connected to a plastic base plate. A rigid component is disposed on the plastic base plate. One end of the rigid component is affixed to the rigid frame on which the active gear wheel is disposed, and the other end of the rigid component is connected to one end of a spring. The other end of the spring is in contact with the rigid frame on which the passive gear wheel is disposed. When the temperature changes or the external force applies to the scanning equipment, the plastic base plate may deform undesirably. However, there is no relative displacement between the two rigid frames because the rigid component connects the two rigid frames. Accordingly, there is no relative displacement between the active gear wheel and the passive gear wheel. In the mean time, the spring in contact with the rigid frame on which the active gear wheel is disposed allows the rigid frame to move along the axis of the rigid component within a predetermined range of distance. When the driving belt loses the tension due to fatigue, change of temperature, or effect of external forces, the spring adjusts the location of one of the rigid frames to increase the distance between two rigid frames so that the driving belt is tightened. The driving belt is then provided with sufficient tension and automatically offsets the strain according to its fatigue condition.

The rigid component of the present invention may be adopted as a guiding track of the scanning module in order to save the production cost.

DETAILED DESCRIPTION OF THE INVENTION

Figure 1:
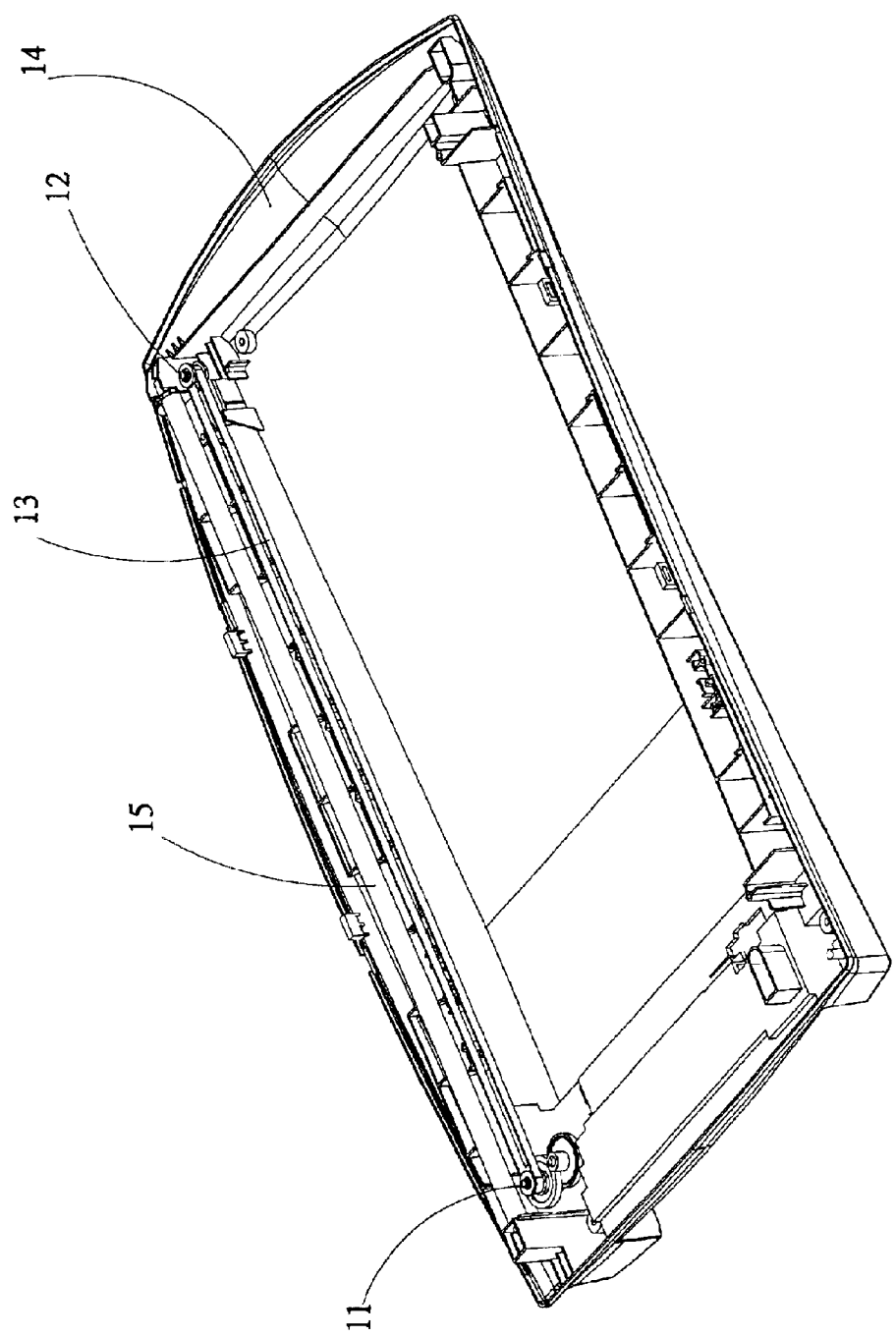
FIG. 1 illustrates the driving device in the scanner according to the prior art.
Figure 2:
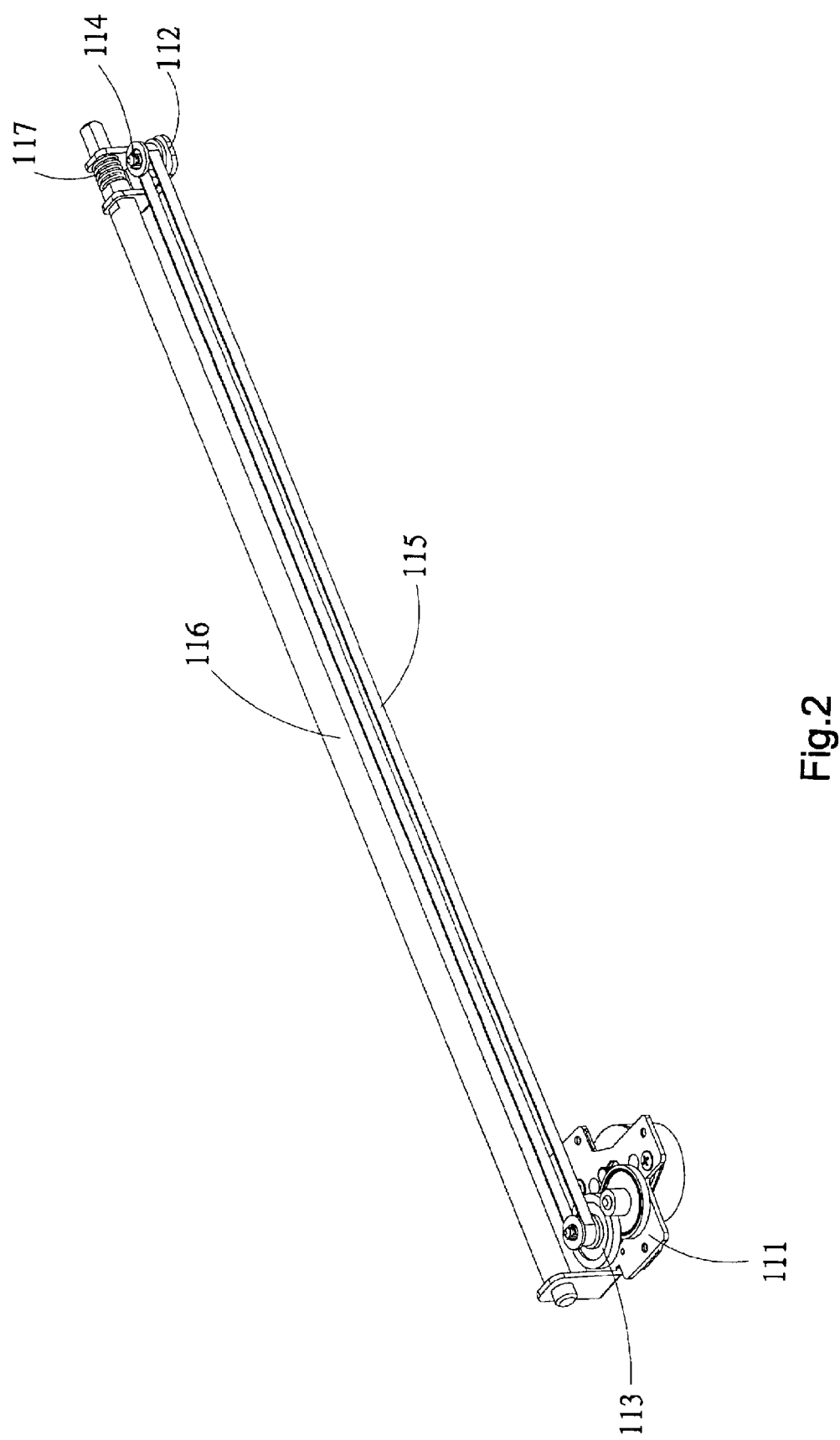
FIG. 2 illustrates the driving device for the scanning module according to the present invention.

As shown in FIG. 2, the driving device of the present invention includes a first rigid frame 111, a second rigid frame 112, an active gear wheel 113, a passive gear wheel 114, a driving belt 115, a rigid component 116, and an elastic component 117. According to an embodiment of the present invention, a rigid material is used as the material of the two rigid frames 111 and 112 to prevent deformation of the two rigid frames 111 and 112. An active gear wheel 113 is disposed on the first rigid frame 111. The axis of the active gear wheel 113 is affixed to the first rigid frame 111 by means of a connecting device. When the active gear wheel 113 rotates, there is no relative displacement between the axis of the active gear wheel 113 and the first rigid frame 111. Similar as above, a passive gear wheel 114 is disposed on the second rigid frame 112. The axis of the passive gear wheel 114 is also affixed to the second rigid frame 112 by means of a connecting device. When the passive gear wheel 114 rotates, there is also no relative displacement between the axis of the passive gear wheel 114 and the second rigid frame 112. A looped driving belt 115 connects the active gear wheel 113 and the passive gear wheel 114. In one of the embodiments of the present invention, the driving belt 115 has many teeth to engage with the active gear wheel 113 and the passive gear wheel 114 so that the driving belt 115 does not slip over the gear wheels 113 and 114. The active gear wheel 113 is also connected with a motor. The motor provides the power to the active gear wheel 113 to drive the driving belt 115, and the driving belt 115 moves around the active gear wheel 113 and the passive gear wheel 114.

Figure 3A:
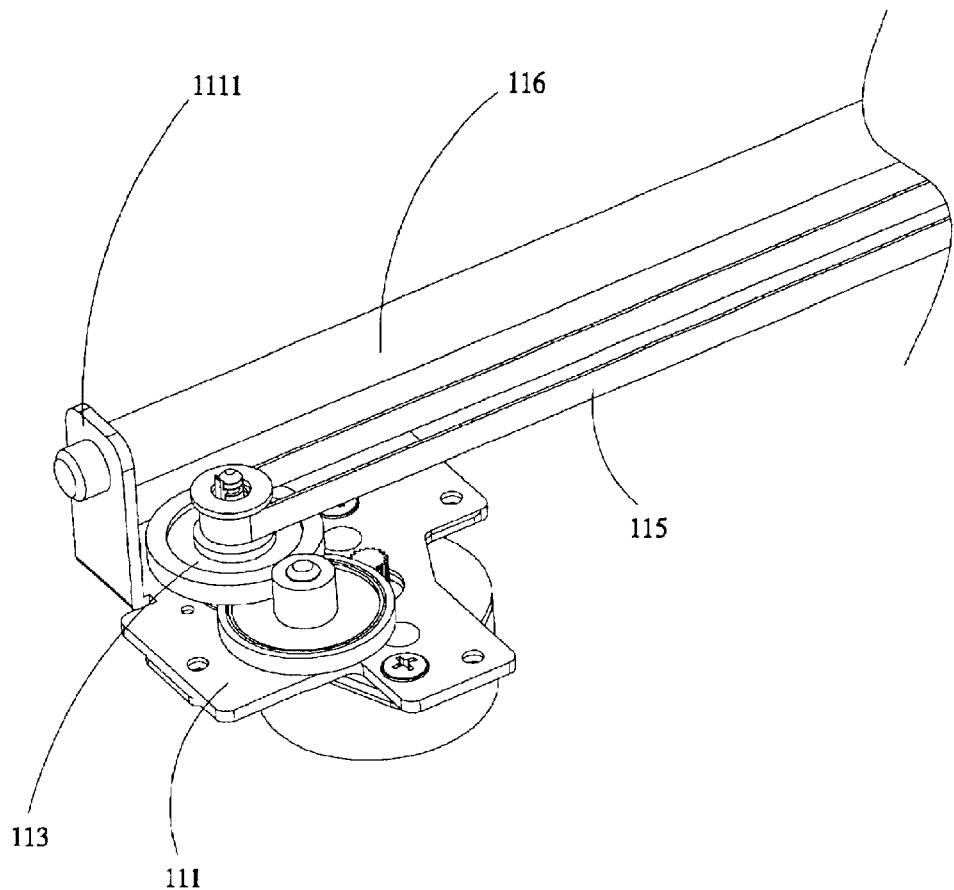
FIG. 3a presents a perspective view of the driving device on the side of the active gear wheel according to the present invention.

The driving device of the present invention includes a rigid component 116 to connect the first rigid frame 111 with the second rigid frame 112. In one of the embodiments, as shown in FIG. 3a, the first rigid frame 111 further includes a first component 1111 with a hole. The rigid component 116 has a groove at one end, and the groove is designed to have a suitable width to accommodate the connection of the first component 1111 and the rigid component 116. When the rigid component 116 is sleeved into the hole of the first component 1111, the first component 1111 is then engaged in the groove of the rigid component 116. This connecting method saves the production cost and reduces the difficulty of assembly. There is also no relative displacement between the first rigid frame 111 and the rigid component 116 when adopting this connecting method.

Figure 3B:
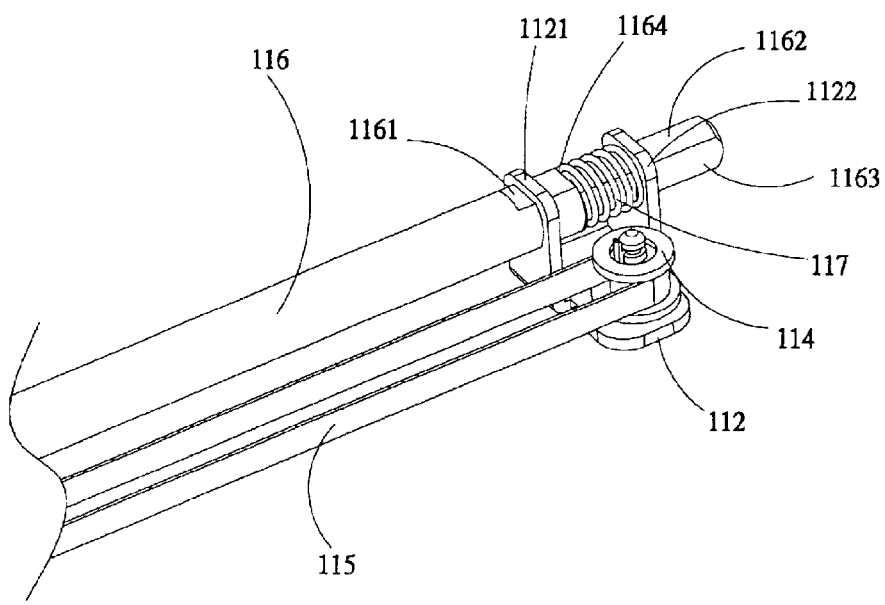
FIG. 3b presents a perspective view of the driving device on the side of the passive gear wheel according to the present invention.

In one of the embodiments of the present invention, as shown in FIG. 3b, the second rigid frame 112 includes a first component 1121 and a second component 1122, each of which has a hole. The rigid component 116 is sleeved into the holes of the first component 1121 and the second component 1122 respectively. The rigid component 116 has a first cut-off surface 1161 at one end to match the rim of the hole on the first component 1121 and a second cut-off surface 1163 at the same end to match the rim of the hole on the second component 1122. Therefore the rigid frame 112 does not rotate when it is moving along the axis of the rigid component 116. The rigid component 116 may further include a third cut-off surface 1162 functioning the same as the first cut-off surface 1161 and the second cut-off surface 1163.

As shown in FIG. 3b, an elastic component 117 sleeves the end of the rigid component 116 and is disposed between the first component 1121 and the second component 1122 of the second rigid frame 112. The elastic component 117 may be a spring in one of the embodiments. One end of the rigid component 116 has a vertical surface 1164. One end of the elastic component 117 is in contact with the vertical surface 1164, which is perpendicular to the moving direction of the elastic component 117, to prevent the corresponding end of the elastic component 117 from moving back and forth along the rigid component 116. The other end of the elastic component 117 is in contact with a surface provided by the second component 1122 of the second rigid frame 112. The second rigid frame 112 is therefore able to move within a predetermined distance along the axis of the rigid component 116 because of the elongation and compression ability of the elastic component 117.

Figure 4:
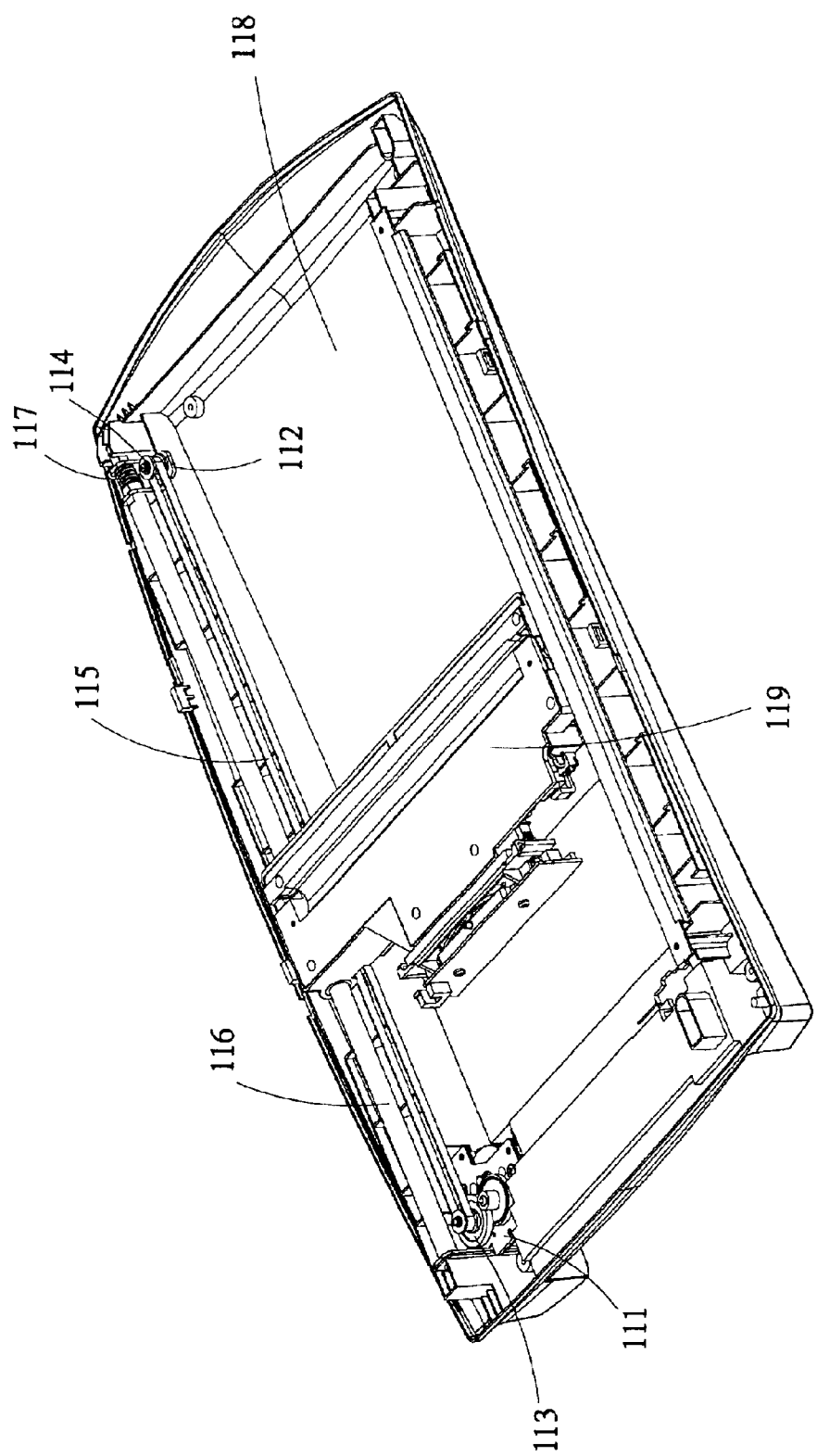
FIG. 4 illustrates the driving device along with the base plate and the scanning module according to the present invention.
Figure 5A:
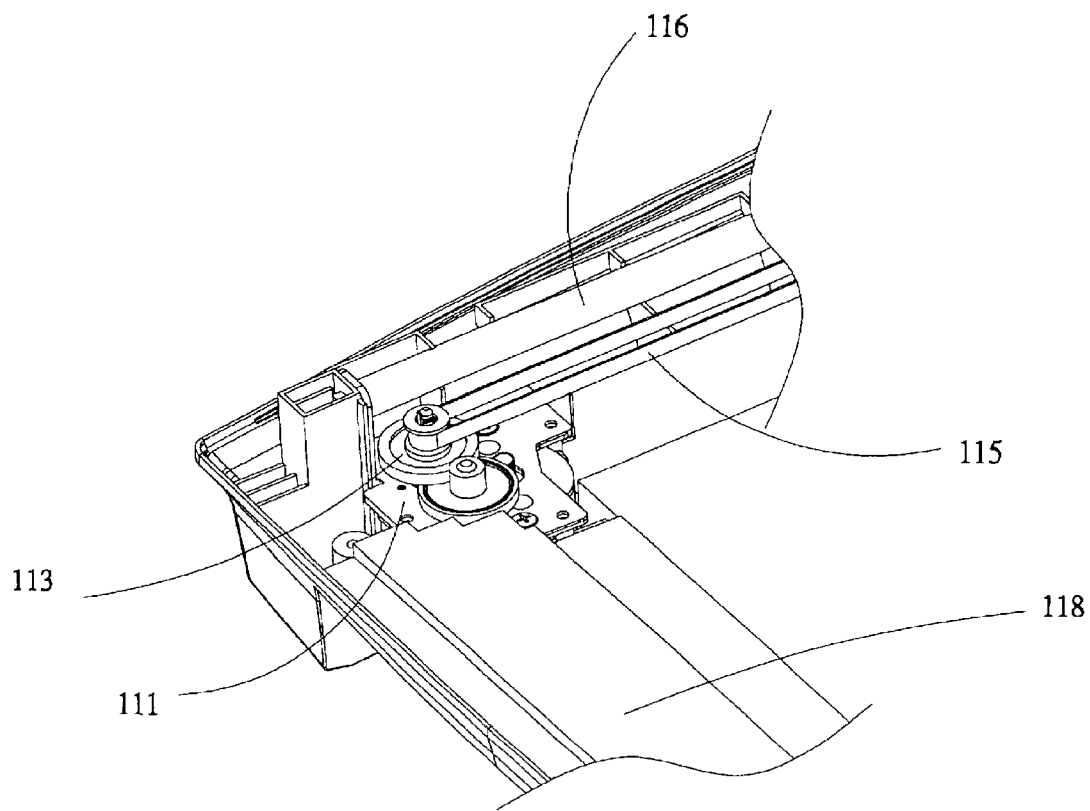
FIG. 5a presents a perspective view of the driving device on the side of the active gear wheel along with the base plate according to the present invention.
Figure 5B:
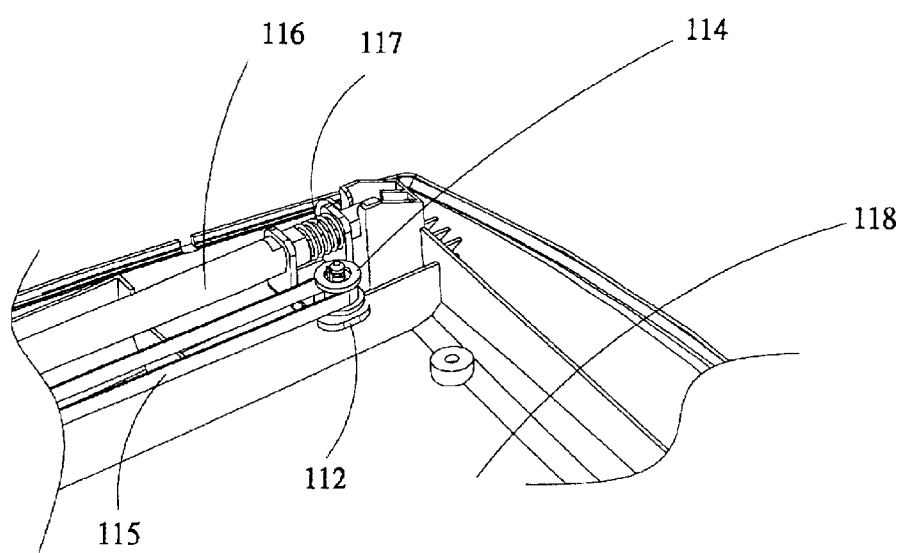
FIG. 5b presents a perspective view of the driving device on the side of the passive gear wheel along with the base plate according to the present invention.

After the driving device for the scanning module is assembled as shown in FIG. 2, the driving device is then connected with the base plate 118 and the driving module 119, as shown in FIG. 4. FIG. 5a presents a perspective view illustrating the details of the active gear wheel along with the base plate. The first rigid frame 111 is affixed to the base plate 118, and there is no relative displacement between the first rigid frame 111 and the base plate 118 accordingly. FIG. 5b presents a perspective view illustrating the details of the passive gear wheel along with the base plate. The second rigid frame 112 is not connected to the base plate 118 directly, so the second rigid frame 112 is able to move freely along the axis of the rigid component 116. Because the first rigid frame 111 and the second rigid frame 112 are connected with each other by the rigid component 116, an imaginary line passing through the center of the active gear wheel 113 and the center of the passive gear wheel 114 remains unchanged during operation of the driving device. As shown in FIG. 5b, one end of the rigid component 116 is sleeved into the elastic component 117 which is in a compressed condition. Theoretically, the elastic component 117 always elongates or contracts to its neutral length in which the elastic potential energy is the lowest. When the driving belt 115 loses the tension due to fatigue, change of temperature, or effect of external forces, the compressed elastic component 117 elongates toward the end of the rigid component 116. The elastic component 117 then pushes the second rigid frame 112 to move slightly toward the end of the rigid component 116. This structure automatically adjusts the driving belt 115 so that the driving belt 115 always has the appropriate tension and automatically offsets the strain according to its fatigue condition.

As shown in FIG. 4, FIG. 5a, and FIG. 5b, another advantage of the present invention is that the rigid component 116 connecting the first rigid frame 111 and the second rigid frame 112 can also be adopted as a guiding track of the scanning module 119. This design saves the production cost and is easily to be assembled. Even if the base plate 118 deforms because the temperature changes or the external force is applied to the scanning equipment, the rigid component 116 acts to prevent the displacement of the active gear wheel 113 with respect to the passive gear wheel 114. Therefore an imaginary line passing through the center of the active gear wheel 113 and the center of the passive gear wheel 114 remains unchanged. Moreover, the elastic component 117 elongates automatically so that the driving belt 115 always has the suitable tension even if the base plate 118 deforms.

The rigid component 116 may be any rigid component with appropriate rigidity, including any metal component. The elastic component 117 is preferably a spring but not limited to a spring. Any appropriate elastic component 117 may be adopted by the present invention. Furthermore, the first rigid frame 111 is engaged into the groove of the rigid component 116 in one of the embodiments. However, this is not to limit the connecting method of the first rigid frame 111 and the rigid component 116. Any appropriate connecting device, e.g. a screw, or any connecting method may be adopted by the present invention. The second rigid frame 112 is not limited to have only the first component 1121 and the second component 1122. Also, the cut-off surfaces 1161, 1162, and 1163 of the rigid component 116 and the holes of the first component 1121 and the second component 1122 of the second rigid frame 112 are not limited to the design described above. Any design which allows the second rigid frame 112 to move along the axis of the rigid component 116 may also be adopted by the present invention.

The driving device for the scanning module disclosed by the present invention solves the problems caused by the deformation of the base plate 118. The present invention also solves the problems caused by losing tension of the driving belt 115. Please be noted that although a scanner is a preferred embodiment, the application of the driving device for the scanning module according to the present invention is not limited to a scanner. Any scanning apparatus, multiple function peripheral, or other applicable field is falling into the scope of the present invention.

It will be understood that certain features and sub-combinations are of utility and may be employed without reference to other features and sub-combinations as they are outlined within the claims. While the preferred embodiment and application of the invention has been described, it is apparent to those skilled in the art that the objects and features of the present invention are only limited as set forth in claims attached hereto.

What is claimed is:

1. A driving device for a module, comprising:

a first rigid frame;

a second rigid frame;

an active gear wheel disposed on said first rigid frame;

a passive gear wheel disposed on said second rigid frame;

a driving belt engaged with said active gear wheel and said passive gear wheel;

a rigid component having a first end and a second end, said first end being affixed to said first rigid frame, said second end including a vertical surface and being connected to said second rigid frame; and an elastic component having a first end and a second end, said first end being in contact with the vertical surface of said second end of said rigid component, said elastic component sleeving said second end of said rigid component;

wherein said elastic component interacts with said second rigid frame to allow said second rigid frame to move along the axis of said rigid component within a predetermined distance when required to adjust the tension of said driving belt, said second rigid frame having a first component with a first hole; and a second component with a second hole and a surface, said second component being spaced from said first component by a predetermined space; wherein said rigid component is sleeved into said first hole and said second hole, said elastic component is disposed between said first component and said second component, and said second end of said elastic component is in contact with said surface of said second component.

2. The driving device of claim 1, wherein said elastic component is a spring.

3. The driving device of claim 1, wherein said module movably connects to said rigid frame.

4. The driving device of claim 1, wherein said second end of said rigid component has a cut-off surface to prevent said second rigid frame from rotating.

5. The driving device of claim 1, wherein said module is a scanning module for scanning an image.

6. The driving device of claim 4, wherein said first hole of said second rigid frame defines a rim cooperating with said cut-off surface of said rigid component to prevent said second rigid frame from rotating.

7. The driving device of claim 4, wherein said second hole of said second rigid frame defines a rim cooperating with said cut-off surface of said rigid component to prevent said second rigid frame from rotating.

8. A scanner comprising:

a driving device for a module;

wherein said driving device further comprising:

a first rigid frame;

a second rigid frame;

an active gear wheel disposed on said first rigid frame;

a passive gear wheel disposed on said second rigid frame;

a driving belt engaged with said active gear wheel and said passive gear wheel;

a rigid component having a first end and a second end, said first end being affixed to said first rigid frame, said second end including a vertical surface and being connected to said second rigid frame; and an elastic component having a first end and a second end, said first end being in contact with said vertical surface of said second end of said rigid component, said elastic component sleeving said second end of said rigid component, wherein said second rigid frame having a first component with a first hole; and a second component with a second hole and a surface, said second component being spaced from said first component by a predetermined space; wherein said rigid component is sleeved into said first hole and said second hole, said elastic component is disposed between said first component and said second component, and said second end of said elastic component is in contact with said surface of said second component.

9. A multiple function peripheral comprising:

a driving device for a scanning module;

wherein said driving device further comprising:

a first rigid frame;

a second rigid frame;

an active gear wheel disposed on said first rigid frame;

a passive gear wheel disposed on said second rigid frame;

a driving belt engaged with said active gear wheel and said passive gear wheel;

a rigid component having a first end and a second end, said first end being affixed to said first rigid frame, said second end including a vertical surface and being connected to said second rigid frame; and an elastic component having a first end and a second end, said first end being in contact with said vertical surface of said second end of said rigid component, said elastic component sleeving said second end of said rigid component, wherein said second rigid frame having a first component with a first hole; and a second component with a second hole and a surface, said second component being spaced from said first component by a predetermined space; wherein said rigid component is sleeved into said first hole and said second hole, said elastic component is disposed between said first component and said second component, and said second end of said elastic component is in contact with said surface of said second component.

* * * * *